United States Patent
Roberts

(10) Patent No.: US 8,051,184 B2
(45) Date of Patent: Nov. 1, 2011

(54) METHOD FOR ASSIGNING RANDOM PAIRINGS TO DATA ENTRIES

(76) Inventor: David R. Roberts, Potomac, MD (US)

( * ) Notice: Subject to any disclaimer, the term of this patent is extended or adjusted under 35 U.S.C. 154(b) by 2044 days.

(21) Appl. No.: 11/011,551

(22) Filed: Dec. 14, 2004

(65) Prior Publication Data

US 2005/0108182 A1    May 19, 2005

Related U.S. Application Data

(63) Continuation-in-part of application No. 09/535,722, filed on Mar. 27, 2000, now abandoned.

(51) Int. Cl.
*G06F 13/00* (2006.01)

(52) U.S. Cl. ........ 709/228; 709/223; 705/319; 707/775; 707/769; 707/706; 434/322

(58) Field of Classification Search ................... 709/223, 709/227, 228; 705/319, 7.11, 7.12, 7.13; 707/775, 769, 706; 434/322
See application file for complete search history.

(56) References Cited

U.S. PATENT DOCUMENTS

| | | | |
|---|---|---|---|
| 5,740,252 A | 4/1998 | Minor et al. | |
| 5,930,801 A | 7/1999 | Falkenhainer et al. | |
| 6,144,964 A | 11/2000 | Breese et al. | |
| 6,199,014 B1 | 3/2001 | Walker et al. | |
| 6,247,018 B1 | 6/2001 | Rheaume | |
| 6,249,282 B1 * | 6/2001 | Sutcliffe et al. | 715/751 |
| 6,272,467 B1 | 8/2001 | Durand et al. | |
| 6,636,887 B1 * | 10/2003 | Augeri | 709/203 |
| 6,735,568 B1 | 5/2004 | Buckwalter et al. | |
| 2002/0095298 A1 * | 7/2002 | Ewing | 705/1 |
| 2003/0073472 A1 | 4/2003 | Varley | |
| 2003/0074253 A1 | 4/2003 | Scheuring et al. | |

OTHER PUBLICATIONS

ChristmasMatch.com website—"How to" Demo—Archived Feb. 4, 2005—http://replay.waybackmachine.org/20050204043846/http://christmasmatch.com/xmmweb_int.htm.*
ChristmasMatch.com website—"How to" Demo—Archived Jun. 3, 2001—http://replay.waybackmachine.org/20010603041403/http://christmasmatch.com/xmmweb_int.htm.*
"Discrete Optimization Algorithms With Pascal Programs", Maciej M. Syslo et al, Printice-Hall, Inc. pp. vii-x, 343-344, 370374.
Secret Santa Name Picker, as Viewed on Jul. 13, 2004 on the Internet at http://www.tenasoft.com/secretsanta/purchase.htm.

\* cited by examiner

*Primary Examiner* — Kenneth R Coulter

(57) ABSTRACT

A method for pairing elements of a first set of elements $\{x(i)\}$ with elements from a second set of elements $\{y(j)\}$ subject to a plurality of pairing restrictions. In accordance with one embodiment of the method, for each of a plurality of iterations of the method, or until a set of pairings is found that satisfies the plurality of pairing restrictions, a random set of pairings between elements of the second set of elements and elements of the second set of elements is selected. The set of mismatched pairings is identified and, if the number of pairings in the set of mismatched pairings is not greater than a maximum number, pairings in the set of mismatched pairings are interchanged. If the number of pairings in the set of mismatched pairings is greater than one, each mismatched pairing is swapped with another pairing if the resulting pairings satisfy the plurality of pairing restrictions.

20 Claims, 3 Drawing Sheets

METHOD FOR ASSIGNING RANDOM PAIRINGS TO DATA ENTRIES

CROSS REFERENCE TO RELATED APPLICATIONS

This application is a continuation in part of U.S. patent application Ser. No. 09/535,722, filed Mar. 27, 2000 now abandoned, and titled "Method for Assigning Random Pairings to Data Entries".

COPYRIGHT NOTICE

A portion of the disclosure of this patent document contains material that is subject to copyright protection. The copyright owner has no objection to the facsimile reproduction of the patent document, or the patent disclosure, as it appears in the Patent and Trademark Office patent file or records, but otherwise reserves all copyrights whatsoever.

FIELD

This invention relates generally to the field of operations research. More particularly, this invention relates to a method for assigning random pairings between data elements subject to a set of restrictions.

BACKGROUND

The problem of assigning random pairings between data elements subject to a set of restrictions occurs in many areas. The pairings may be between elements of the same data set, in which each element of the data set is paired with another element from the same set, or between elements from different data sets in which each element from a first data set is assigned to an element of a second data set.

An example of an assignment problem between elements from different data sets is the assignment of a set of people to a set of tasks. Some people are restricted from performing specific tasks, so the assignment is restricted. For example, a person may be unable or unqualified to perform a particular task.

An example of pairings between elements of the same data set is a "Secret Santa" gift exchange, in which each person in a workgroup is assigned to give a gift to another (randomly selected) member of the workgroup. There may be restrictions to the assignment. For example, a person may not be permitted to buy a gift for a direct supervisor or receive a gift from a direct subordinate. A restriction is used to designate a specified pairing of gift giver and gift receiver as prohibited.

The assignment may be made manually, whereby a person randomly assigns pairs and then makes changes as needed in an attempt to avoid prohibited pairings.

Alternatively, all of the possible pairings can be examined, and the finally set of pairings can be chosen at random from among those pairings that meet all of the restrictions.

However, as the number of data elements becomes large, both of these methods fail. For example, in a group of 15 elements (a 15 member workgroup for example) there are billions of possible pairings. If, in addition, there are many restrictions, a manual search is unlikely to find a set of pairings that meets all of the restrictions. An exhaustive search, even by a fast computer will also take a prohibitively long time, even with as few as 10-15 entries.

SUMMARY

The present invention relates generally to a method for assigning random pairings between data elements subject to a set a restrictions. Objects and features of the invention will become apparent to those of ordinary skill in the art upon consideration of the following detailed description of the invention.

In one embodiment of the invention a set of pairings is selected at random. The set of mismatched (prohibited) pairings, if any, is identified. If the number of mismatched pairings is small, pairings within the set of mismatched pairings are interchanged. If this fails to find pairings that meet the requirements, a partial search is performed in which 2 or 3 pairs are exchanged at a time. If this fails to find pairings that meet the requirements, another set of pairings is selected at random. This cycle is repeated a predetermined number of times or until a set of pairings is found that satisfies all of the pairing restrictions.

BRIEF DESCRIPTION OF THE DRAWINGS

The novel features believed characteristic of the invention are set forth in the appended claims. The invention itself, however, as well as the preferred mode of use, and further objects and advantages thereof, will best be understood by reference to the following detailed description of an illustrative embodiment when read in conjunction with the accompanying drawing(s), wherein:

DETAILED DESCRIPTION

Figure 1:
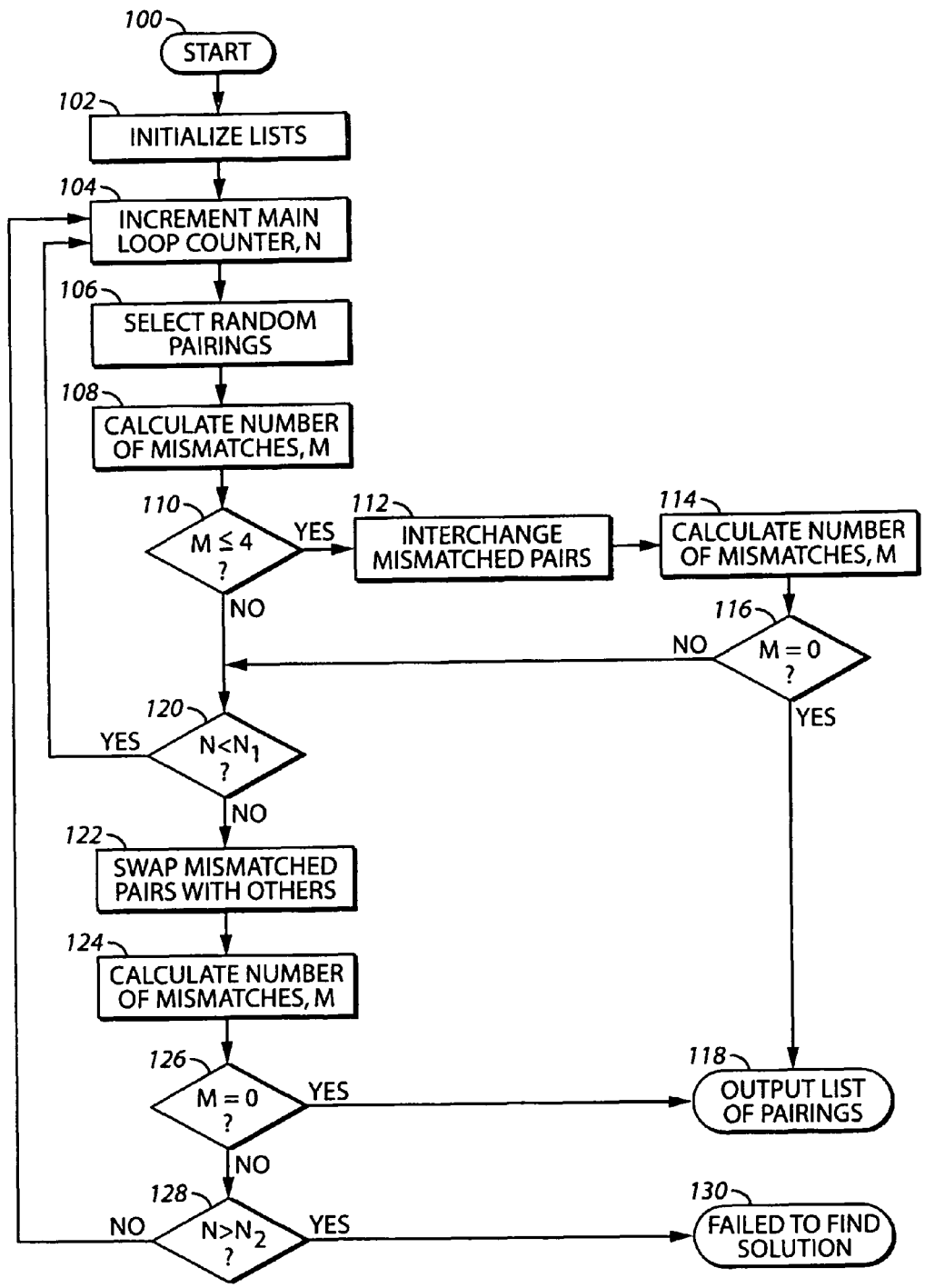
FIG. 1 is a flow chart of a method consistent with certain embodiments of the invention.

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the description below, like reference numerals are used to describe the same, similar or corresponding parts in the several views of the drawings.

One embodiment of the present invention relates to a method for solving an assignment problem. The method used to solve the problem involves sequencing of calculations followed by adjustment of solutions, as illustrated in the flow chart of FIG. 1. Referring to FIG. 1, following start block 100, two lists of elements to be paired and a list of restrictions are generated at block 102. For example, in a computer implementation of the method, the list of elements and the restrictions may be entered via a remote or local user interface. For example, if two lists of ten elements are generated, the elements of the first list may be labeled $x(i)$, with $1 \leq i \leq 10$, and the elements of the second list may be labeled $y(i)$, with $1 \leq j \leq 10$. The lists may be same, as in the Secret Santa application, in which case the set of gift givers $\{x(i)\}$ is the same as the set of gift receivers $\{y(j)\}$. An example restriction table is shown as Table 1.

TABLE 1

| i\j | 1 | 2 | 3 | 4 | 5 | 6 | 7 | 8 | 9 | 10 |
|---|---|---|---|---|---|---|---|---|---|---|
| 1 | 1 | 0 | 0 | 0 | 0 | 0 | 1 | 0 | 1 | 1 |
| 2 | 0 | 1 | 1 | 0 | 0 | 1 | 1 | 1 | 1 | 1 |

TABLE 1-continued

| i\j | 1 | 2 | 3 | 4 | 5 | 6 | 7 | 8 | 9 | 10 |
|---|---|---|---|---|---|---|---|---|---|---|
| 3 | 0 | 1 | 1 | 1 | 0 | 1 | 1 | 1 | 1 | 1 |
| 4 | 0 | 0 | 1 | 1 | 0 | 0 | 1 | 0 | 1 | 1 |
| 5 | 0 | 0 | 0 | 0 | 1 | 0 | 1 | 1 | 0 | 0 |
| 6 | 0 | 1 | 1 | 0 | 0 | 1 | 1 | 0 | 1 | 1 |
| 7 | 1 | 1 | 1 | 1 | 1 | 1 | 1 | 0 | 0 | 0 |
| 8 | 0 | 1 | 1 | 0 | 1 | 0 | 0 | 1 | 1 | 1 |
| 9 | 1 | 1 | 1 | 1 | 0 | 1 | 0 | 1 | 1 | 0 |
| 10 | 1 | 1 | 1 | 1 | 0 | 1 | 0 | 1 | 0 | 1 |

An entry '1' in the table indicates a prohibited pairing, while a '0' indicates an allowed pairing. The Table 1 specifies that, for example, element i=6 cannot be paired with elements j=2, 3, 6, 7, 9 or 10. If the two lists contained different elements, the table may not be symmetric.

At block 104, a loop counter, N, is initialized to enable counting of the number of times the method is repeated. At block 106 a set of random pairings is generated. An exemplary set of random pairings is illustrated in Table 2.

TABLE 2

| X | 1 | 2 | 3 | 4 | 5 | 6 | 7 | 8 | 9 | 10 |
|---|---|---|---|---|---|---|---|---|---|---|
| y | 2 | 4 | 1 | 5 | 8 | 9 | 3 | 6 | 10 | 7 |

Figure 2:
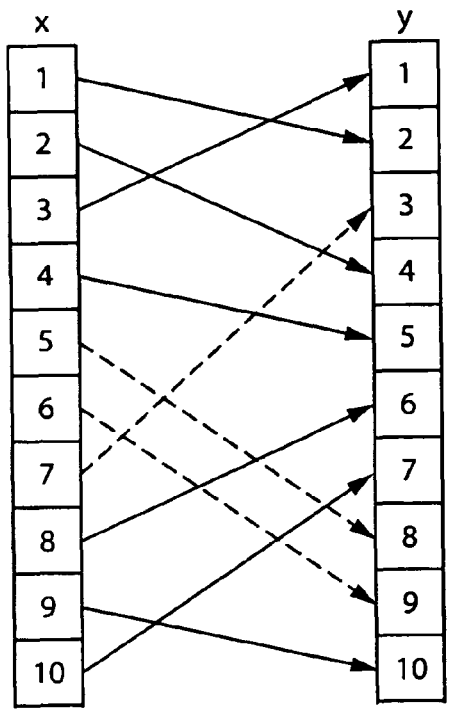
FIGS. 2-6 are diagrammatic representations of exemplary pairings consistent with certain embodiments of the invention.
Figure 5:
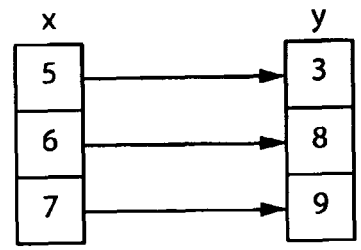
Figure 3:
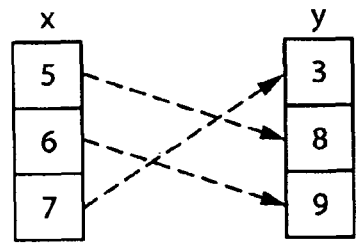
Figure 4:
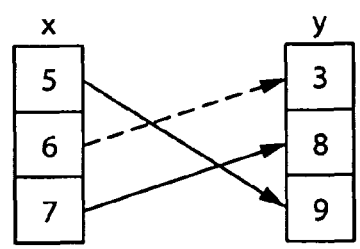

Table 2 illustrates that x(1) is paired with y(2), x(2) with y(4), x(3) with y(1), etc. The pairings of Table 2 are represented diagrammatically in FIG. 2. In FIG. 2, the solid arrows denote permitted pairings while the broken line arrows indicated prohibited pairings. Referring again to FIG. 1, at block 108, the number, M, of mismatched or prohibited pairs is calculated. In this example it can be seen that the pairs [x(5), y(8)], [x(6),y(9)] and [x(7),y(3)] are mismatched, since they do not satisfy the restrictions. At decision block 110, a check is made to determine if the number, M, of mismatched pairs is less than or equal to some maximum number. The maximum number, which will be referred to as the 'swap maximum' is 4 in this embodiment, but may be larger. If the number of mismatched pairs is less than or equal to the swap maximum, the mismatched pairs are interchanged or swapped with one another at block 112. After the swapping of mismatched pairs, the number of mismatched pairs is recalculated at block 114. If there are no mismatched pairs, as indicated by the positive branch from decision block 116, the assignment is complete and the process terminates at block 118, outputting the list of pairings for display or storage. In the example provided above in Table 1 and Table 2, the number of mismatched pairings is three, so the mismatched pairs shown diagrammatically in FIG. 3 may be interchanged to give the pairings [x(5),y(9)], [x(6),y(3)], [x(7),y(8)] (shown in FIG. 4) and the pairings [x(5),y(3)], [x(6),y(8)], [x(7),y(9)] (shown in FIG. 5). In FIGS. 3-5, the solid arrows indicate permitted pairings while the broken line arrows indicate prohibited pairings. The pairing [x(6),y(3)] in the first set of pairings (FIG. 4) is prohibited, but the pairings in the second set of pairings (FIG. 5) are all allowed. A solution to this exemplary assignment problem is therefore as given in Table 3.

TABLE 3

| x | 1 | 2 | 3 | 4 | 5 | 6 | 7 | 8 | 9 | 10 |
|---|---|---|---|---|---|---|---|---|---|---|
| y | 2 | 4 | 1 | 5 | 3 | 8 | 9 | 6 | 10 | 7 |

Figure 6:
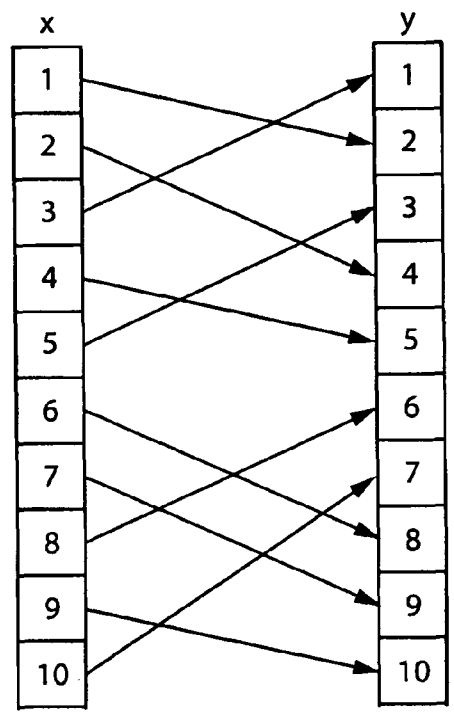

The solution may be checked against the table of restrictions to confirm that none of the pairings in Table 3 is prohibited. The solution is shown diagrammatically in FIG. 6.

Note that the indices for y elements in the two set of pairings are (9,3,8) and (3,8,9), which may both be obtained by a rotation the original indices (8,9,3).

If there are four mismatched pairs [x(a),y(i)], [x(b), y(j)], [x(c), y(k)], and [x(d), y(l)] say, the pairs may be swapped according to Table 4.

TABLE 4

| 1 | 2 | 3 | 4 | 5 | 6 | 7 | 8 | 9 |
|---|---|---|---|---|---|---|---|---|
| i | j | j | j | k | k | k | l | l |
| j | i | k | l | i | l | l | i | k |
| k | l | l | i | l | i | j | j | i |
| l | k | i | k | j | j | i | k | j |

The column labeled '1' in Table 4, indicates that the number of mismatches in the set of pairings [x(a),y(j)], [x(b), y(i)], [x(c), y(l)], and [x(d), y(k)] is calculated first, and then the number of mismatches in the assignment [x(a),y(j)], [x(b), y(k)], and [x(c), y(l)], [x(d), y(i)] is tested, and so on, until a solution in found or all 9 possible interchanges have been tested.

Referring again to FIG. 1, if the interchange of mismatched pairs fails to find a solution, as indicated by the negative branch from decision block 116, or the number of mismatched pairs is greater than the swap maximum, as indicated by the negative branch from decision block 110, flow continues to decision block 120. At decision block 120, the loop counter, N, is checked to determine if the number of loops is less than a first threshold number of loop, $N_1$. If N is less than $N_1$, as indicated by the positive branch from decision block 120, flow returns to block 104 where the main loop counter is incremented and the process is repeated. If N is greater than or equal to $N_1$, as indicated by the negative branch from decision block 120, each of the remaining mismatched pairs is swapped, at block 122, with any other pair—provided that the result of the swap is allowed. This process is described in more detail below. If swapping the remaining mismatched pairs succeeds in finding a solution, as indicated by the positive branch from decision block 126, the assignment is complete and the process terminates at block 118, outputting the list of pairings for display or storage. If swapping the remaining mismatched pairs fails to find a solution, as indicated by the negative branch from decision block 126, a test is performed at decision block 128 to determine if the number of complete loops N exceeds a maximum number $N_2$ of complete loops. If the number of complete loops exceeds the maximum number of complete loops, as indicated by the positive branch from decision block 128, the process terminates at block 130. Otherwise, as indicated by the negative branch from decision block 128, flow continues to block 104, where the loop counter is incremented and a new loop is started. The maximum number $N_2$ of complete loops may be chosen so that the amount of time spent trying to find a solution is not excessive.

In the "Secret Santa" example, the process is repeated for a fixed number of attempts, or until two conditions are met. The conditions are: 1) each person listed buys and receives exactly one gift; 2) none of the resulting matches violate any of the user-defined "restrictions". It can be proven that, if a solution is found, it will be a random, unbiased matching (no matching is inherently favored over another) of giver to receiver from the allowed combinations (those combinations that do not violate any restrictions). When a computer performing the method determines that these conditions are met, it halts the process and displays and/or saves the results. If the computer cannot find a solution within a fixed number of iterations, the user may be directed to add some names and/or remove some restrictions.

The swapping of remaining mismatched pairs at block 122 in FIG. 1 is referred to as a "two-opt" procedure and is based on a discrete optimization technique from the field of Operations Research. This "two-opt" procedure looks for a mismatched pairing [x(i),y(j)] then looks for any other pairing [x(k),y(l)] (allowed or not) such that the swapping of the recipients would result in two new pairings, [x(i),y(l)] and [x(k),(j)] that are not in violation of any restrictions. The use of the swapping routines and the "two-opt" routine significantly increases both the likelihood and speed of finding a solution. As the number of restrictions increases relative to the number of names, the effectiveness of these routines increases.

Figure 7:
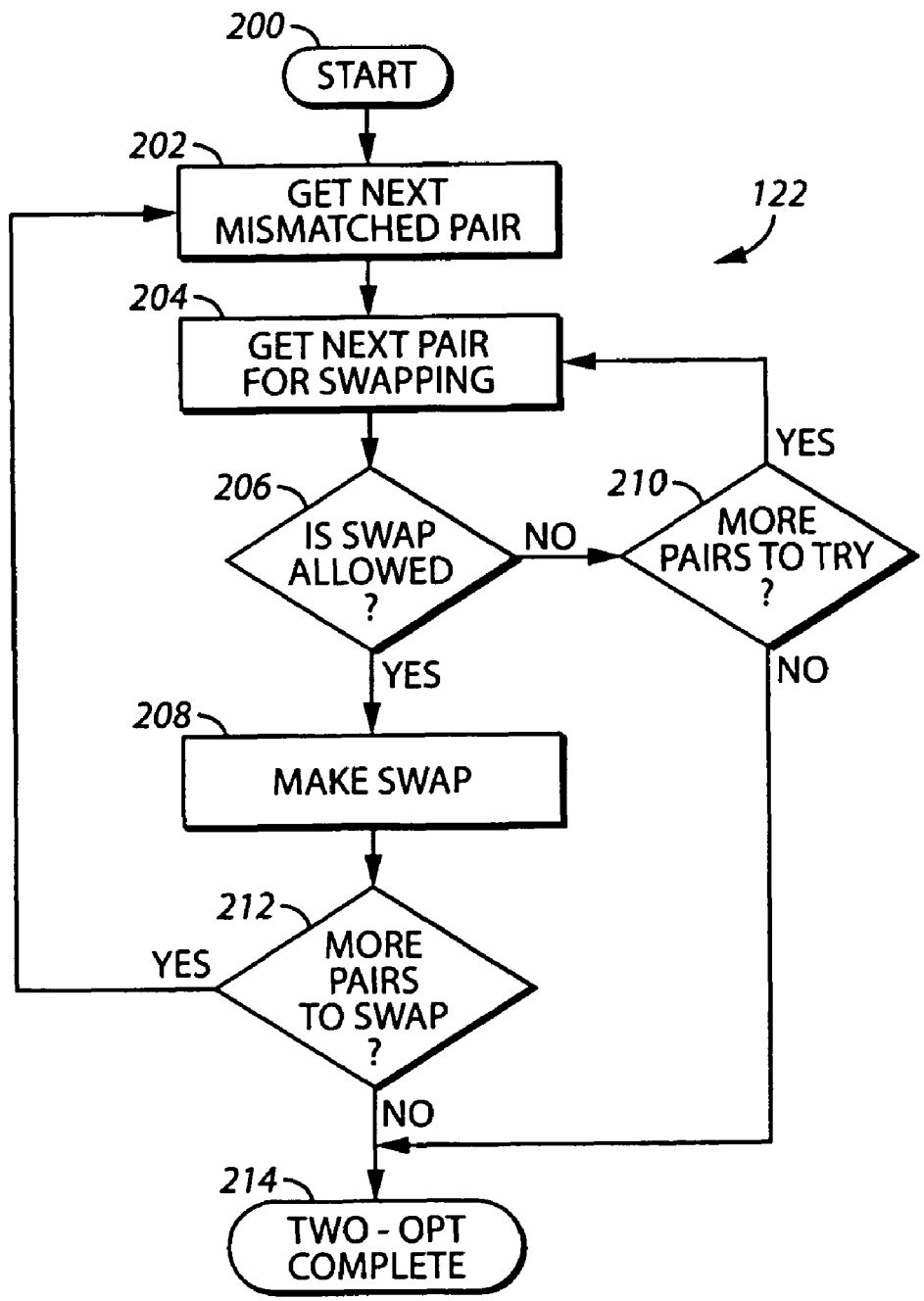
FIG. 7 is a flow chart of a method consistent with certain embodiments of the invention.

FIG. 7 is a flow chart of an exemplary embodiment of a "two-opt" process performed at block 122 in FIG. 1. Referring to FIG. 7, following start block 200, the first mismatched pair ([x(i),y(j)], say) is selected at block 202. At block 204 a potential pair ([x(k),y(l)], say) to be swapped with the first mismatched pair is selected. At decision block 206, a check is made, by reference to the table of restrictions, to determine if the results of the swap are allowed, that is if both of the pairs [x(i),y(l)] and [x(k),y(j)] are allowed. If the swap is allowed, as indicated by the positive branch from decision block 206, the swap is made at block 208. If the swap is not allowed, as indicated by the negative branch from decision block 206, a check is made at decision block 210 to determine if there are any other potential swaps to be tried. If there are more swaps to be tried, flow returns to block 204, otherwise, as indicated by the positive branch from decision block 208, flow continues to decision block 212. At decision block 212 a check is made to determine if all of the mismatched pairs have been processed or if there are more mismatched pairs to swap. If there are more mismatched pairs to swap, as indicated by the positive branch from decision block 212, flow returns to block 202. Otherwise, as indicated by the negative branch from decision block 212, the two-opt process is complete and ends at block 214.

In a further embodiment, a three-opt routine is used in place of or following the two-opt routine described above with reference to FIG. 7. In the three-opt routine, instead of looking for single pairs to swap with each mismatched pairs, swaps between the mismatched pairs and two other pairs are considered at each step (the others pairs may or may not be mismatched). The three-opt routine increases the amount of computation, but also increases the likelihood of finding a solution.

In the three opt process, a mismatched pairing [x(i),y(j)] is selected and then second and third pairings [x(k),y(l)] and [x(m),y(n)] are selected. The pairings [x(i),y(j)], [x(k),y(l)] and [x(m),y(n)] are replaced with the new pairings [x(i),y(l)], [x(k),y(n)] and [x(m),y(j)] or the pairings [x(i),y(n)], [x(k),y(j)] and [x(m),y(l)] if the new pairings satisfy the plurality of restriction requirements.

A number of variations to the embodiment of the invention described above will be apparent to those of ordinary skill in the art. The general method comprises random number generation and assignment, followed by some combination of iterations of the random assignment along with adjustments to a random but prohibited solution. If the number of restrictions is small relative to the number of names, simply repeating the random assignment routine usually results in a solution, though there is little advantage in avoiding the "two-opt" routine. However, as the number of restrictions increases, it becomes much more unlikely that repeated random matches will result in a solution. For example, with only 10 elements and only three restrictions per element, a random matching may generate a solution less than 5% of the time. Further this percentage might be much lower (even zero) if the number of restrictions is higher, so this technique may be very slow.

The simple approach of explicit enumeration (describing every possible combination) followed by random selection among the allowable combinations is impractical as the number of elements to be assigned increases, since the number of possible solutions grows exponentially with the number of names. For example, as the number of names increases from 5 to 15, the number of possible matches increases from 24 to almost 100 Billion.

The method of the invention has been implemented on the Internet at the www.ChristmasMatch.com website to provide a service to users of the website. To use the service, a user enters their information by entering a list of names and making entries in a table of restrictions. This information is then processed by the script code that is embedded in the page. The script can be run on the host machine (the server that hosts the website) or on the user's computer. The service may be provided at a charge to the user or provided free as a means of attracting users to a commercial website.

Alternatively, the method may be embodied in software that runs on a computer or other processor. For example, the software may be run on a personal digital assistant (PDA), cell phone, electronic calculator or personal computer.

It will be apparent to those of ordinary skill in the art, upon reading the above teachings, that the assignment method of the present invention has application in many areas. An example is a scheduling or timetable problem, where events (such as lessons) are assigned to timetable slots. A further example is the assignment of a set of resources to a set of projects.

Those skilled in the art will appreciate that the software and associated data used to implement the embodiments described above can be implemented using disc storage as well as other forms of storage, such as, for example, Read Only Memory (ROM) devices, Random Access Memory (RAM) devices, optical storage elements, magnetic storage elements, magneto-optical storage elements, flash memory, core memory and/or other equivalent storage technologies without departing from the present invention. Such alternative storage devices should be considered equivalents.

The present invention, as described in embodiments herein, is implemented using a programmed processor executing programming instructions that are broadly described above in flow chart form that can be stored on any suitable electronic storage medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Error trapping can be added and/or enhanced and variations can be made in user interface and information presentation without departing from the present invention. Such variations are contemplated and considered equivalent.

An exemplary program listing in Netscape Corporation's JAVASCRIPT™ object-oriented scripting language is given below.

PROGRAM LISTING (© 2000, David Roberts)

```
// **** RANDOM RANKINGS ************
for (i=0; i<=nnames-1; i++)
{
random = Math.random( )
rand[i] = random
if (i >= nnames) {rand[i] = 1}
rank[i] = 0
rec[i] = 0
if (log == 10)
        {alert ("after rand: rand[" + i + "] = " + rand[i])}
}
for (i=0; i<=nnames-1; i++)
{
rank[i]=0
for (j=0; j<=nnames-1; j++)
{
if (rand[i] > rand[j]) { rank[i] = rank[i] + 1}
}
rec[i] = rank[i]
if (log == 10) {alert ("rank[" + i + "] = " + rank[i])}
if (log == 10) {alert ("rec[" + i + "] = " + rec[i])}
}
for (i=0; i<=nnames-1; i++)
{
for (j=0; j<=nnames-1; j++)
{
if (rec[i] == j) {givrec[i][j] = 1}
if (log ==10) {alert ("illegal[" + i + "][" + j + "]= " +
            illegal[i] [j])}
if (log ==10) {alert ("givrec[" + i + "][" + j + "]= " +
            givrec[i] [j])}
}
}
if (log == 10)
{
for (i=0; i<=nnames-1; i++)
{
if (nnames >=i+1)
{
//alert ("rec[" + i + "] = " + rec[i])
//alert ("eval(rec[" + i + "]) = " + eval(rec[i]))
//alert ("names[rec[" + i + "]] = " + names[rec[i]])
    alert   ("test misg: " + names[i] + " to " +
(names[eval(rec[i])]))
}
}
}
// ******* BEGIN 4 swap ************
    if (misg == 4)
    {
                    swap1 = 0
                    swap2 = 0
                    swap3 = 0
                    swap4=0
                    rswap1 = 0
                    rswap2 = 0
                    rswap3 = 0
                    rswap4=0
                    temp = 0
                    if (log == 1) { alert ("begin fourswap")}
                    for (i=0; i<=14; i++)
                {
                    if (swap1 > 0) {if (swap2 > 0) {if (swap3 >0) {if
(swap4 == 0) {if (misgiv[i] == 1) {swap4 = i}}}}}
                    if (swap1 > 0) {if (swap2 > 0) {if (swap3 == 0) {if
(misgiv[i] == 1) {swap3 = i}}}}
                    if (swap1 > 0) {if (swap2 == 0) {if (misgiv[i] == 1)
{swap2 = i}}}
                    if (swap1 == 0) {if (misgiv[i] == 1) {swap1 = i}}
                    }
                    for (i=0; i<=14; i++)
                {
                    if (rec[swap1] == i) {rswap1 = i}
                    if (rec[swap2] == i) {rswap2 = i}
                    if (rec[swap3] == i) {rswap3 = i}
                    if (rec[swap4] == i) {rswap4 = i}
                    }
                    rec[swap1] = rswap2
```

| PROGRAM LISTING (© 2000, David Roberts) |
| --- |

```
                    rec[swap2] = rswap3
                    rec[swap3] = rswap4
                    rec[swap4] = rswap1
                    rswap1 = rec[swap1]
                    rswap2 = rec[swap2]
                    rswap3 = rec[swap3]
                    rswap4 = rec[swap4]
                        for (i=0; i<=14; i++)
                        {
                        for (j=0; j<=14; j++)
                        {
                        givrec[i] [j] = 0
                        if (rec[i] == j) {givrec[i] [j] = 1}
                        }
                        }
                    misg = 0
                    for (i=0; i<=14; i++)
      {
                    misgiv[i] = 0
                    for (j=0; j<=14; j++)
      {
                    misgiv[i] = misgiv[i] + (givrec[i] [j] * illegal[i] [j])
                    }
                    misg = misg + misgiv[i]
                    }
                    if (log == 1) {alert ("end of fourswap misg = " +
misg)}
            }
    // ******* BEGIN 3 swap ************
        if (misg == 3)
            {
                    swap1 = 0
                    swap2 = 0
                    swap3 = 0
                    swap4 = 0
                    rswap1 = 0
                    rswap2 = 0
                    rswap3 = 0
                    rswap4 = 0
                    temp = 0
                    for (i=0; i<=14; i++)
            {
                    if (swap1 > 0) {if (swap2 > 0) {if (swap3 == 0) {if
(misgiv[i] == 1) {swap3 = i}}}}
                    if (swap1 > 0) {if (swap2 == 0) {if (misgiv[i] == 1)
{swap2 = i}}}
                    if (swap1 == 0) {if (misgiv[i] == 1) {swap1 = i}}
                    }
                    for (i=0; i<=14; i++)
            {
                    if (rec[swap1] == i) {rswap1 = i}
                    if (rec[swap2] == i) {rswap2 = i}
                    if (rec[swap3] == i) {rswap3 = i}
                    }
                    rec[swap1] = rswap2
                    rec[swap2] = rswap3
                    rec[swap3] = rswap1
                    rswap1 = rec[swap1]
                    rswap2 = rec[swap2]
                    rswap3 = rec[swap3]
                        for (i=0; i<=14; i++)
                        {
                        for (j=0; j<=14; j++)
                        {
                        givrec[i] [j] = 0
                        if (rec[i] == j) {givrec[i][j] = 1}
                        }
                        }
                    misg = 0
                    for (i=0; i<=14; i++)
            {
                    misgiv[i] = 0
                    for (j=0; j<=14; j++)
            {
                    misgiv[i] = misgiv[i] + (givrec[i] [j] * illegal[i] [j])
                    }
                    misg = misg + misgiv[i]
                    }
```

PROGRAM LISTING (© 2000, David Roberts)

```
                                if (log == 1) {alert ("end of threeswap misg = " +
misg)}
                        }
        // ******* BEGIN 2 swap *************
                        if (misg == 2)
                        {
                                swap1 = 0
                                swap2 = 0
                                rswap1 = 0
                                rswap2 = 0
                                temp = 0
                                for (i=0; i<=14; i++)
                                {
                                        if (swap1 > 0) {if (swap2 == 0) {if (misgiv[i] == 1)
{swap2 = i}}}
                                        if (swap1 == 0) {if (misgiv[i] == 1) {swap1 = i}}
                                }
                                for (i=0; i<=14; i++)
                                {
                                        if (rec[swap1] == i) {rswap1 = i}
                                        if (rec[swap2] == i) {rswap2 = i}
                                }
                                rec [swap1] = rswap2
                                rec [swap2] = rswap1
                                rswap1 = rec[swap1]
                                rswap2 = rec[swap2]
                                        for (i=0; i<=14; i++)
                                        {
                                        for (j=0; j<=14; j++)
                                        {
                                        givrec[i] [j] = 0
                                        if (rec[i] == j) {givrec[i] [j] = 1}
                                        }
                                        }
                                misg = 0
                                for (i=0; i<=14; i++)
                                {
                                misgiv[i] = 0
                                for (j=0; j<=14; j++)
                                {
                                misgiv[i] = misgiv[i] + (givrec[i] [j] * illegal[i] [j])
                                }
                                misg = misg + misgiv[i]
                                }
                                if (log == 1) {alert ("end of twoswap misg = " + misg)}
                        }
        // ****** BEGIN 2 OPT **********************
                                if (misg > 0) {
                                if (count >5) {
                                        if (log == 1) {alert ("begin of 2 opt loop misg = "
+ misg)}
                                        for (i = 0; i<=14; i++)
                                        {
                                        for (j= 0; j<=14; j++)
                                        {
                                        xol=0
                                        if (givrec[i] [j] == 1) {
                                        if (illegal[i] [j] == 1) {
                                        if (log == 1) {alert ("2 opt found one illegal
assignment - " + names[i] + " to " + names[j])}
                                                for (x=0; x<=14; x++)
                                                {
                                                for (y=0; y<=14; y++)
                                                {
                                                        if (xol == 0) {if (givrec[x] [y] == 1)
{if (illegal[i] [y] == 0) {if (illegal[x] [j] == 0) {
                                                        xol = 1
                                                        givrec[i][j]=0
                                                        givrec[x][y]=0
                                                        givrec[i][y]=1
                                                        givrec[x][j]=1
                                                        if (log == 1) {alert ("old: " + names[i] + "
to " + names[j] + " and " + names[x] + " to " + names[y])}
                                                        if (log == 1) {alert ("new: " + names[i] + "
to " + names[y] + " and " + names[x] + " to " + names[j])}
                                                                }}}}
                                                }
                                                }
```

| PROGRAM LISTING (© 2000, David Roberts) |
|---|

```
            }}
            // close givrec illegal loops
          }
        }
        misg = 0
        for (i=0; i<=14; i++)
        {
        misgiv[i] = 0
        for (j=0; j<=14; j++)
        {
        misgiv[i] = misgiv[i] +
                (givrec[i] [j] * illegal[i] [j])
        }
        misg = misg + misgiv[i]
        }
              // **** set rec Array ******
              for (i=0; i<=14; i++)
              {
              rec[i]=0
              for (j=0; j<=14; j++)
              {
              if (givrec[i] [j] == 1) {rec[i]=j}
              }
              }
      if (log == 1) { alert ("end of 2 opt loop misg = " + misg)}
      }}
// close misg and count loops
// **** END 2 opt LOOP ********
```

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A computer method performed by a programmed processor for pairing elements of a first set of elements {x(i)} with elements from a second set of elements {y(j)}, where i and j are indices and where the first set of elements and the second set of elements have the same number of elements, subject to a plurality of pairing restrictions, the method comprising:
a user defining the first set of elements and the second set of elements;
the user defining the plurality of pairing restrictions via a user interface of the programmed processor, wherein each pairing restriction of the plurality of pairing restrictions defines a specified pairing of an element of the first set of elements and an element of the second set of elements as prohibited;
for each of a plurality of iterations or until a set of pairings is found that satisfies the plurality of pairing restrictions:
selecting a random set of pairings between elements of the first set of elements and elements of the second set of elements, wherein each element of the first set of elements is paired with exactly one element of the second set of elements;
identifying a set of mismatched pairings, from the random set of pairings, that do not satisfy the plurality of pairing restrictions;
if the number of pairings in the set of mismatched pairings is greater than or equal to one and not greater than a defined maximum number of mismatched pairings: interchanging pairings in the set of mismatched pairings;

if the number of pairings in the set of mismatched pairings is greater than or equal to one and greater than the defined maximum number of mismatched pairings:
swapping each mismatched pairing with another pairing if the resulting pairings satisfy the plurality of pairing restrictions, wherein the another pairing is selected from one or more of the set of mismatched pairings and the random set of pairings exclusive of the set of mismatched pairings and wherein selecting the another pairing from the random set of pairings exclusive of the set of mismatched pairings breaks the another pairing prior to being swapped with the mismatched pairing; and
if there are no mismatched pairings:
providing a list of randomly paired elements to the user via the user interface, wherein the list of randomly paired elements are randomly assigned pairings between the first set of elements and the second set of elements that solve an assignment problem.

2. A method in accordance with claim 1, wherein interchanging pairings in the set of mismatched pairings comprises:
interchanging pairings in the set of mismatched pairings if the resulting pairings satisfy the plurality of pairing restrictions.

3. A method in accordance with claim 1, wherein interchanging pairings in the set of mismatched pairings comprises:
interchanging pairings in the set of mismatched pairings if the resulting pairings reduce the number of pairings that do not satisfy the plurality of pairing restrictions.

4. A method in accordance with claim 1, wherein swapping each mismatched pairing with another pairing comprises:
selecting a mismatched pairing [x(i),y(j)];
selecting a second pairing [x(k),y(l)]; and
replacing the pairings [x(i),y(j)] and [x(k),y(l)] with the pairings [x(i),y(l)] and [x(k),y(j)] if the pairings [x(i),y(l)] and [x(k),y(j)] satisfy the plurality of restriction requirements.

5. A method in accordance with claim 1, wherein swapping each mismatched pairing with another pairing comprises:
   selecting a mismatched pairing [x(i),y(j)];
   selecting a second pairing [x(k),y(l)];
   selecting a third pairing [x(m),y(n)]; and
   if the pairings [x(i),y(l)], [x(k),y(n)] and [x(m),y(j)] satisfy the plurality of restriction requirements:
      replacing the pairings [x(i),y(j)], [x(k),y(l)] and [x(m),y(n)] with the pairings [x(i),y(l)], [x(k),y(n)] and [x(m),y(j)];
   else, if the pairings [x(i),y(n)], [x(k),y(j)] and [x(m),y(l)] satisfy the plurality of restriction requirements:
      replacing the pairings [x(i),y(j)], [x(k),y(l)] and [x(m),y(n)] with the pairings [x(i),y(n)], [x(k),y(j)] and [x(m),y(l)].

6. A method in accordance with claim 1, wherein the first set of elements is the same as the second set of elements.

7. A method in accordance with claim 1, wherein the first set of elements comprises a list of names of gift givers, the second set of elements comprises a list of names of gift receivers and the plurality of pairings restrictions comprises a table indicating which giver/receiver pairings are prohibited.

8. A method in accordance with claim 1, wherein the first set of elements comprises a list of people, the second set of elements comprises a list of tasks and the plurality of pairings restrictions comprises a table indicating which tasks each person is prohibited from performing.

9. A method in accordance with claim 1, wherein swapping each mismatched pairing with another pairing is performed only after a specified minimum number iterations has failed to find set of pairings that satisfies the plurality of pairing restrictions.

10. A method in accordance with claim 1, further comprising:
   presenting the user interface to a user of the programmed processor;
   receiving data describing the first set of elements and the plurality of pairing restrictions from the user interface; and
   if a set of pairings is found that satisfies the plurality of pairing restrictions:
      presenting the set of pairings that satisfies the plurality of pairing restrictions to the user via the user interface.

11. A method in accordance with claim 10, further comprising:
   defining the user interface by a web page stored on a network server;
   presenting the user interface to the user via the Internet;
   receiving data describing the first set of elements and the plurality of pairing restrictions from the user interface via the Internet; and
   if a set of pairings is found that satisfies the plurality of pairing restrictions:
      presenting the set of pairings that satisfies the plurality of pairing restrictions to the user via the Internet.

12. A non-transitory computer readable electronic storage medium storing a plurality of program instructions, which when executed on a computer, perform a method comprising:
   a user defining the first set of elements and the second set of elements;
   the user defining a plurality of pairing restrictions via a user interface of the computer, wherein each pairing restriction of the plurality of pairing restrictions defines a specified pairing of an element of a first set of elements and an element of a second set of elements as prohibited;
   selecting a random set of pairings between elements of the first set of elements and elements of the second set of elements, wherein the first set of elements and the second set of elements have the same number of elements and wherein each element of the first set of elements is paired with exactly one element of the second set of elements;
   identifying a set of mismatched pairings, from the random set of pairings, that do not satisfy a plurality of pairing restrictions;
   if the number of pairings in the set of mismatched pairings is greater than or equal to one and not greater than a defined maximum number of mismatched pairings:
      interchanging pairings in the set of mismatched pairings; and
   if the number of pairings in the set of mismatched pairings is greater than or equal to one and greater than the defined maximum number of mismatched pairings:
      swapping each mismatched pairing with another pairing if the resulting pairings satisfy the plurality of pairing restrictions, wherein the another pairing is selected from one or more of the set of mismatched pairings and the random set of pairings exclusive of the set of mismatched pairings and wherein selecting the another pairing from the random set of pairings exclusive of the set of mismatched pairings breaks the another pairing prior to being swapped with the mismatched pairing; and
   if there are no mismatched pairings:
      providing a list of randomly paired elements to the user via the user interface, wherein the list of randomly paired elements are randomly assigned pairings between the first set of elements and the second set of elements that solve an assignment problem.

13. A computer readable medium in accordance with claim 12, wherein the interchange of pairings in the set of mismatched pairings is performed if the resulting pairings satisfy the plurality of pairing restrictions.

14. A computer readable medium in accordance with claim 12, wherein the interchange of pairings in the set of mismatched pairings is performed if the resulting pairings reduce the number of pairings that do not satisfy the plurality of pairing restrictions.

15. A computer readable medium in accordance with claim 12, wherein the swapping of each mismatched pairing with another pairing if the resulting pairings satisfy the plurality of pairing restrictions comprises:
   selecting a mismatched pairing [x(i),y(j)];
   selecting a second pairing [x(k),y(l)]; and
   replacing the pairings [x(i),y(j)] and [x(k),y(l)] with the pairings [x(i),y(l)] and [x(k),y(j)] if the pairings [x(i),y(l)] and [x(k),y(j)] satisfy the plurality of restriction requirements.

16. A computer readable medium in accordance with claim 12, wherein the swapping of each mismatched pairing with another pairing if the resulting pairings satisfy the plurality of pairing restrictions comprises:
   selecting a mismatched pairing [x(i),y(j)];
   selecting a second pairing [x(k),y(l)];
   selecting a third pairing [x(m),y(n)]; and
   if the pairings [x(i),y(l)], [x(k),y(n)] and [x(m),y(j)] satisfy the plurality of restriction requirements:
      replacing the pairings [x(i),y(j)], [x(k),y(l)] and [x(m),y(n)] with the pairings [x(i),y(l)], [x(k),y(n)] and [x(m),y(j)];

else, if the pairings [x(i),y(n)], [x(k),y(j)] and [x(m),y(l)] satisfy the plurality of restriction requirements:
replacing the pairings [x(i),y(j)], [x(k),y(l)] and [x(m),y(n)] with the pairings [x(i),y(n)], [x(k),y(j)] and [x(m),y(l)].

17. A computer readable medium in accordance with claim 12, wherein the swapping of each mismatched pairing with another pairing if the resulting pairings satisfy the plurality of pairing restrictions comprises:
interchanging the mismatched pairing and another pairing if the resulting pairings satisfy the plurality of pairing restrictions; and
interchanging the mismatched pairing and two other pairings if the resulting pairings satisfy the plurality of pairing restrictions.

18. A computer readable medium in accordance with claim 12, wherein the first set of elements is the same as the second set of elements.

19. A computer readable medium in accordance with claim 12, wherein the plurality of program instructions are transmitted to a user via the Internet.

20. A computer readable medium in accordance with claim 12, wherein the plurality of program instructions are executed on a network server in response to user instructions transmitted to the server via the Internet.

* * * * *